(12) United States Patent
Eichinger (10) Patent No.: US 9,643,703 B1
(45) Date of Patent: May 9, 2017

(54) VIBRATION ISOLATION MOUNTING ARRANGEMENT FOR OUTBOARD MOTOR

(71) Applicant: Brunswick Corporation, Lake Forest, IL (US)

(72) Inventor: Charles H. Eichinger, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 101 days.

(21) Appl. No.: 14/593,519

(22) Filed: Jan. 9, 2015

Related U.S. Application Data (60) Provisional application No. 61/945,378, filed on Feb. 27, 2014.

(51) Int. Cl.
  *B63H 21/30* (2006.01)
  *B63H 20/02* (2006.01)
  *F16F 1/38* (2006.01)

(52) U.S. Cl.
  CPC ......... *B63H 20/02* (2013.01); *B63H 21/305* (2013.01); *F16F 1/38* (2013.01); *F16F 1/3807* (2013.01)

(58) Field of Classification Search
  CPC ...... B63H 21/305; B63H 20/02; B63H 21/30; F16F 7/12; F16F 15/08; F16F 15/085; F16F 1/38; F16F 1/3807
  See application file for complete search history.

(56) References Cited

U.S. PATENT DOCUMENTS

| | | | |
|---|---|---|---|
| 5,180,319 A * | 1/1993 | Shiomi | B63H 21/305 248/640 |
| 6,419,534 B1 | 7/2002 | Helsel et al. | |
| 6,830,492 B1 | 12/2004 | Magee et al. | |
| 7,198,530 B1 | 4/2007 | Rothe et al. | |
| 7,244,152 B1 | 7/2007 | Uppgard | |
| 7,896,304 B1 | 3/2011 | Eichinger et al. | |
| 8,118,628 B2 * | 2/2012 | Hagi | B63H 20/02 248/640 |
| 8,820,701 B1 | 9/2014 | Eichinger | |
| 2009/0130926 A1 | 5/2009 | Jaszewski et al. | |
| 2009/0170384 A1 | 7/2009 | Balogh et al. | |
| 2014/0023503 A1 * | 1/2014 | Nakamura | B63H 1/15 416/135 |

* cited by examiner

*Primary Examiner* — Andrew Polay
(74) *Attorney, Agent, or Firm* — Andrus Intellectual Property Law, LLP (57) ABSTRACT

An arrangement is for coupling a vibration isolation mount to an outboard motor. A pocket is formed in a midsection housing of the outboard motor and defines a first concave surface. A cover is configured to be mounted to the midsection housing over the pocket via a plurality of fasteners. The cover defines a second, oppositely concave surface on an inner face thereof. When the cover is mounted to the midsection housing over the pocket, the first concave surface and the second concave surface together form a cavity therebetween for holding a vibration isolation mount therein. One of the first concave surface and the second concave surface has a protrusion that extends into the cavity and contacts the mount held therein upon tightening of the plurality of fasteners to hold the cover over mount in the pocket. A mounting arrangement is also provided.

20 Claims, 6 Drawing Sheets

VIBRATION ISOLATION MOUNTING ARRANGEMENT FOR OUTBOARD MOTOR

CROSS-REFERENCE TO RELATED APPLICATION

The present application claims the benefit of U.S. Provisional Application Ser. No. 61/945,378, filed Feb. 27, 2014, which is hereby incorporated by reference herein.

FIELD

The present disclosure relates to mounting arrangements for supporting an outboard motor on a transom of a marine vessel and to an arrangement for coupling vibration isolation mounts to an outboard motor.

BACKGROUND

U.S. Pat. No. 7,896,304, incorporated herein by reference, discloses a support system for an outboard motor that uses mounts which are configured and positioned to result in an elastic center point being located closely to a roll axis of the outboard motor which is generally vertical and extends through a center of gravity of the outboard motor. The mounts are positioned so that lines which are perpendicular to their respective center lines intersect at an angle which can be generally equal to 90 degrees. The mounts are positioned in non-interfering relationship with the exhaust components of the outboard motor and its oil sump.

U.S. Pat. No. 8,820,701, incorporated herein by reference, discloses a mounting arrangement for supporting an outboard motor with respect to a marine vessel extending in a fore-aft plane. The mounting arrangement comprises first and second mounts that each have an outer shell, an inner wedge concentrically disposed in the outer shell, and an elastomeric spacer between the outer shell and the inner wedge. Each of the first and second mounts extends along an axial direction, along a vertical direction that is perpendicular to the axial direction, and along a horizontal direction that is perpendicular to the axial direction and perpendicular to the vertical direction. The inner wedges of the first and second mounts both have a non-circular shape when viewed in a cross-section taken perpendicular to the axial direction. The non-circular shape comprises a first outer surface that extends transversely at an angle to the horizontal and vertical directions. The non-circular shape comprises a second outer surface that extends transversely at a different, second angle to the horizontal and vertical directions. A method is for making the mounting arrangement.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure includes an arrangement for coupling a vibration isolation mount to an outboard motor. The arrangement comprises a pocket formed in a midsection housing of the outboard motor, the pocket defining a first concave surface. A cover is configured to be mounted to the midsection housing over the pocket via a plurality of fasteners. The cover defines a second, oppositely concave surface on an inner face thereof. When the cover is mounted to the midsection housing over the pocket, the first concave surface and the second concave surface together form a cavity therebetween for holding a vibration isolation mount therein. According to the present disclosure, one of the first concave surface and the second concave surface has a protrusion that extends into the cavity and contacts the mount held therein upon tightening of the plurality of fasteners to hold the cover over mount in the pocket.

Another example of the present disclosure is of a mounting arrangement for supporting an outboard motor on a marine vessel transom. The mounting arrangement comprises a pocket formed in a midsection housing of the outboard motor, the pocket defining a first concave surface. A vibration isolation mount is situated in the pocket and coupled to the marine vessel via a connector extending through a borehole in the mount and coupled to a transom bracket. A cover is configured to be mounted to the midsection housing over the mount in the pocket via a plurality of fasteners, the cover defining a second, oppositely concave surface on an inner face thereof. The first concave surface and the second concave surface define a cavity therebetween. An outer surface of the mount and an inner surface of the cavity have at least one area of relatively localized contact between the two, such that the mount is deformed by relatively localized application of force in a radial direction when the plurality of fasteners are tightened to hold the cover over the mount in the pocket.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
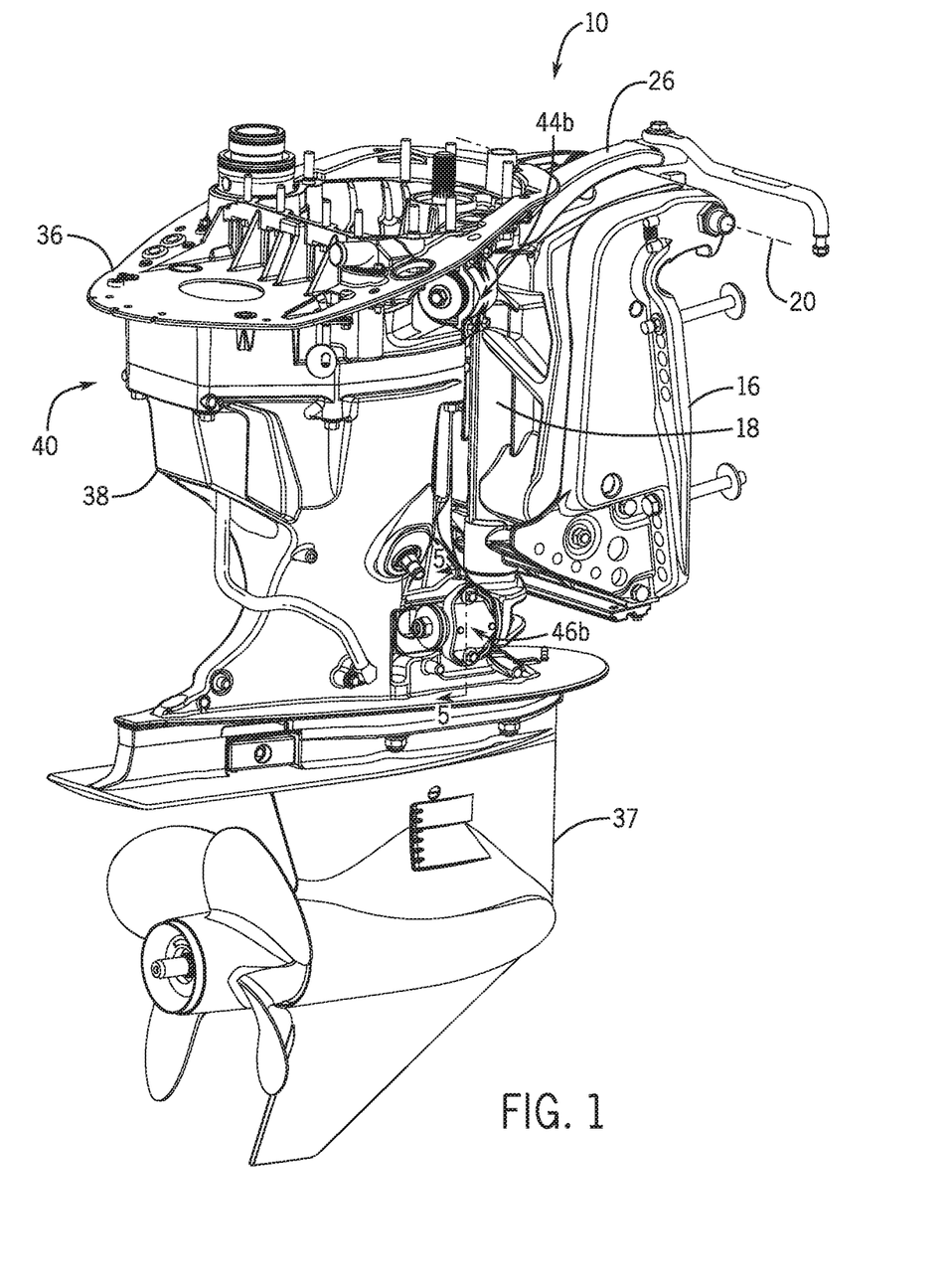
FIG. 1 is a perspective view of a portion of a starboard side of an outboard motor, and a mounting arrangement for supporting an outboard motor on a transom of a marine vessel.
Figure 2:
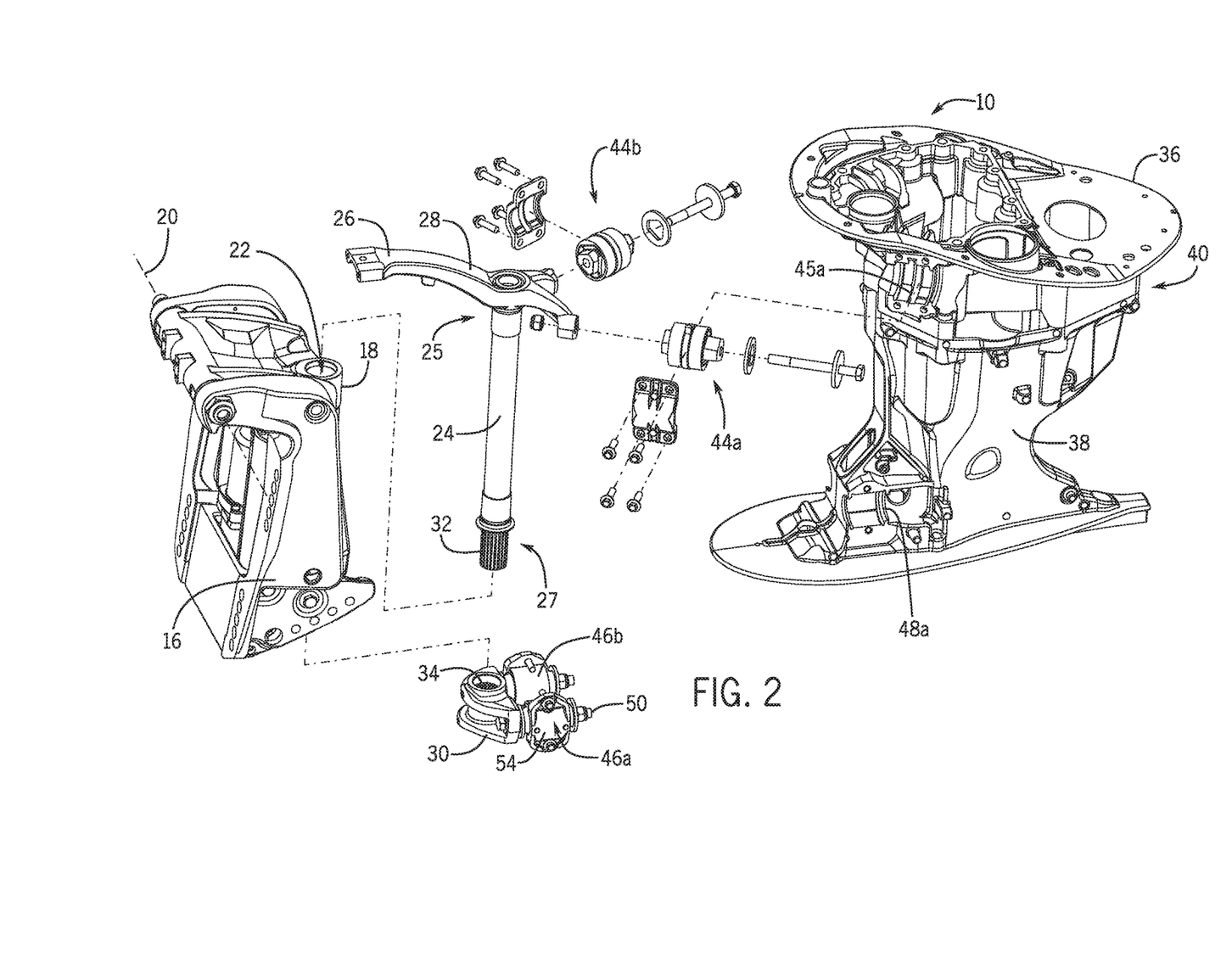
FIG. 2 is an exploded perspective view of a portion of a port side of the mounting arrangement of FIG. 1.
Figure 3:
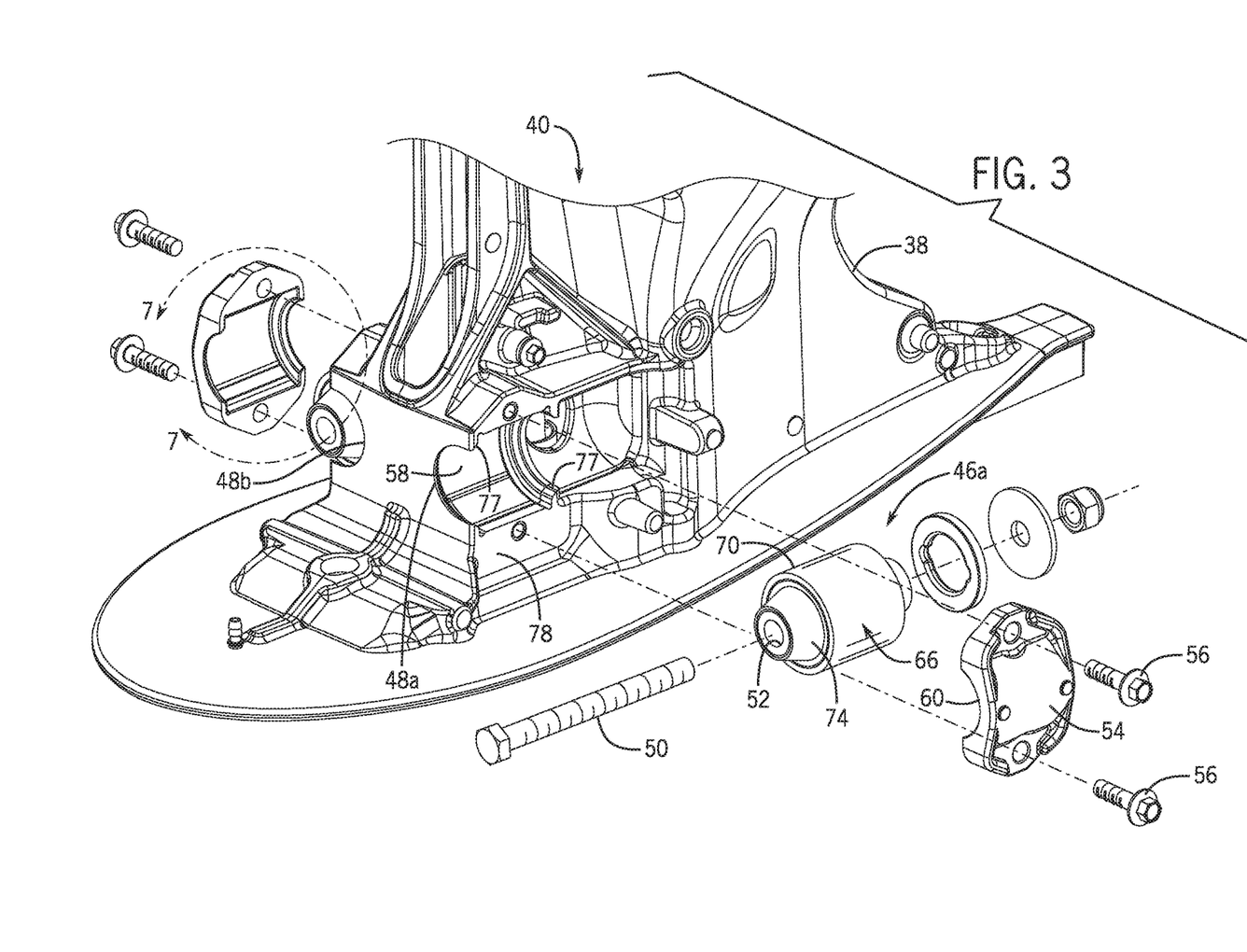
FIG. 3 illustrates an exploded detailed view of a portion of FIG. 2.

FIGS. 1-3 depict a mounting arrangement 10 for supporting an outboard motor with respect to a marine vessel. The exact configuration of the mounting arrangement 10 can vary from that which is shown in the drawings and described herein. For example, the mounting arrangement 10 can be configured for use with a wide variety of outboard motors and marine vessels. In the example shown, the mounting arrangement 10 includes a transom bracket 16 that is configured for attachment to a transom of a marine vessel. A swivel bracket 18 is pivotally attached to the transom bracket 16 in a conventional manner and is configured for rotation about a generally horizontal tilt/trim axis 20. The swivel bracket 18 is provided with a tubular opening 22, which is shaped to receive a tubular steering member 24. The tubular steering member 24 has an upper end 25 that is connected to an upper attachment bracket 28 having a steering arm 26. The tubular steering member 24 has a lower end 27 that is connected to a lower attachment bracket 30. During assembly, the tubular steering member 24 can be rigidly and permanently attached to the upper attachment bracket 28. Then the tubular steering member 24 is inserted in the tubular opening 22 formed in the swivel bracket 18. With the lower end of the tubular steering member 24 extending downwardly through the tubular opening 22, the lower attachment bracket 30 is connected to the lower end 27 of the tubular steering member 24. The lower end 27 of the tubular steering member 24 has splined teeth 32 which are movable into splined engagement with splined teeth 34 formed on an inner portion of the lower attachment bracket 30.

The upper attachment bracket 28 and lower attachment bracket 30 are coupled to a midsection housing 40, comprising a driveshaft housing 38 and an adapter plate 36. More specifically, the upper attachment bracket 28 is connected to the adapter plate 36, which is connected to and supports the driveshaft housing 38 and other components (such as a lower unit 37, FIG. 1) of the outboard motor in a conventional manner. The upper attachment bracket 28 is connected to the adapter plate 36 via first and second upper mounts 44a, 44b, which in one example are vibration isolation mounts. The first and second upper mounts 44a, 44b fit in pockets formed in the midsection housing 40, of which pocket 45a is shown in FIG. 2. One example of the structure of the upper mounts 44a, 44b and their connection to the midsection housing is described in U.S. Pat. No. 8,820,701, which was incorporated by reference above, and will not be described further herein. Of course, differently shaped mounts could be used than those described in the '701 patent.

The lower attachment bracket 30 is connected to the midsection housing 40 by first and second lower mounts 46a, 46b, which in one example are also vibration isolation mounts. Pockets 48a, 48b are formed in the midsection housing 40 of the outboard motor. As shown, one pocket is located on either side of the midsection housing 40, and near a forward lower end thereof. The mounts 46a, 46b are situated in the pockets 48a, 48b and coupled to the marine vessel, more specifically via lower attachment bracket 30, steering member 24, upper attachment bracket 28, steering arm 26, swivel bracket 18, and transom bracket 16. Each of the mounts 46a, 46b are configured and constructed in the same manner, and therefore the description that follows herein below regarding mount 46a equally applies to mount 46b, and vice versa.

Figure 4:
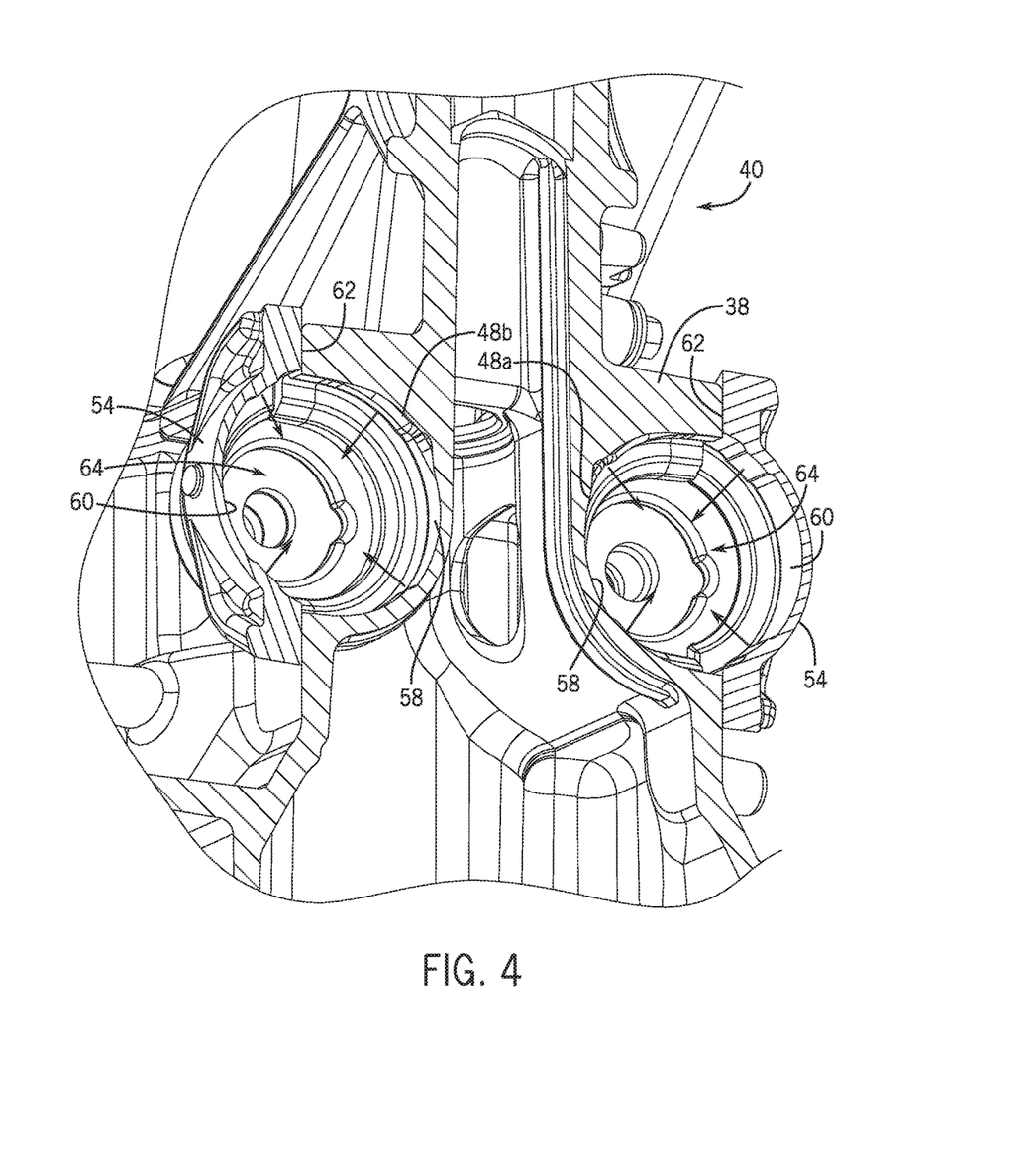
FIG. 4 illustrates a cross-sectional view of a portion of the mounting arrangement of FIGS. 1-3.

The mount 46a is coupled to the marine vessel via a connector 50 extending through a bore hole 52 in the mount 46a and into the lower attachment bracket 30. A cover 54 is configured to be mounted to the midsection housing 40 over the mount 46a in the pocket 48a via a plurality of fasteners 56. Referring also to FIG. 4, the pocket 48a defines a first concave surface 58 and the cover 54 defines a second, oppositely concave surface 60 on an inner face 62 thereof. Together, the first concave surface 58 and the second concave surface 60 define a cavity 64 therebetween. According to the present disclosure, an outer surface 66 (FIG. 3) of the mount 46a and an inner surface of the cavity 64 (which inner surface is defined by the concave surfaces 58, 60) have at least one area of relatively localized contact between the two, such that the mount 46a is deformed by relatively localized application of force in a radial direction, denoted by the arrows in FIG. 4, when the plurality of fasteners 56 are tightened to hold the cover 54 over the mount 46a in the pocket 48a. Slight deformation of the mount 46a in the pocket 48a holds it tightly therein and allows greater manufacturing tolerances for both the pocket 48a and the cover 54, as will be described further herein below. Examples of how such relatively localized contact can be provided are also described herein below.

Figure 5:
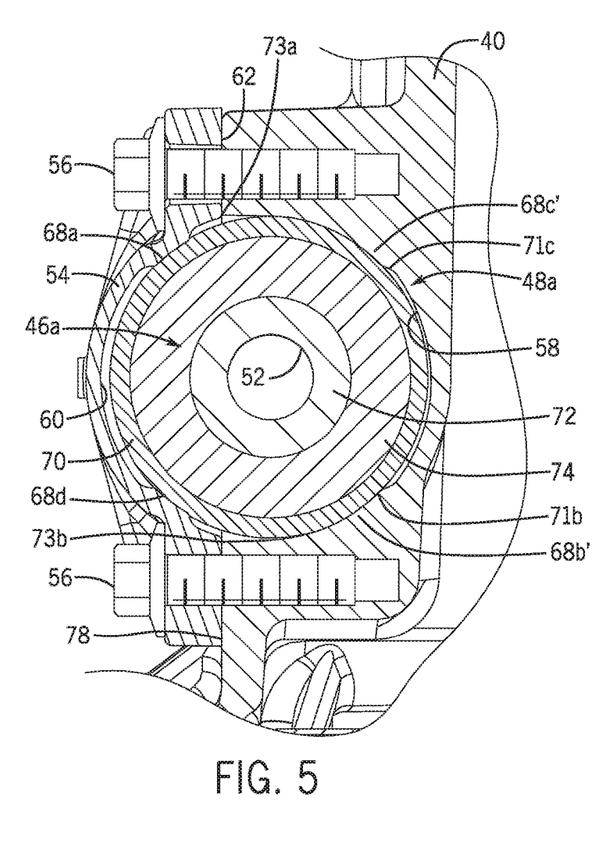
FIG. 5 illustrates a cross sectional view of one example of an arrangement for coupling a vibration isolation mount to an outboard motor, which view is taken along the line 5-5 of FIG. 1.
Figure 6:
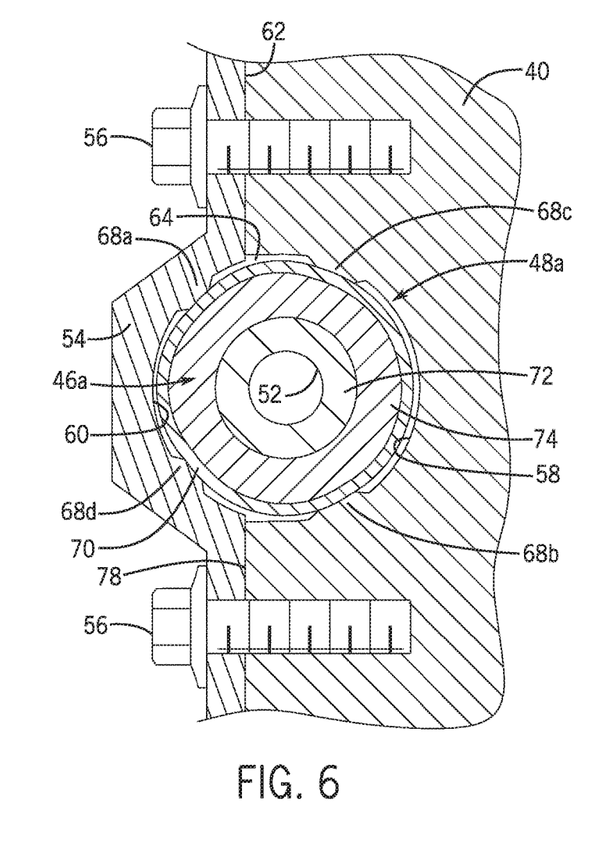
FIG. 6 illustrates a cross sectional view of another example of an arrangement for coupling a vibration isolation mount to an outboard motor.
Figure 7:
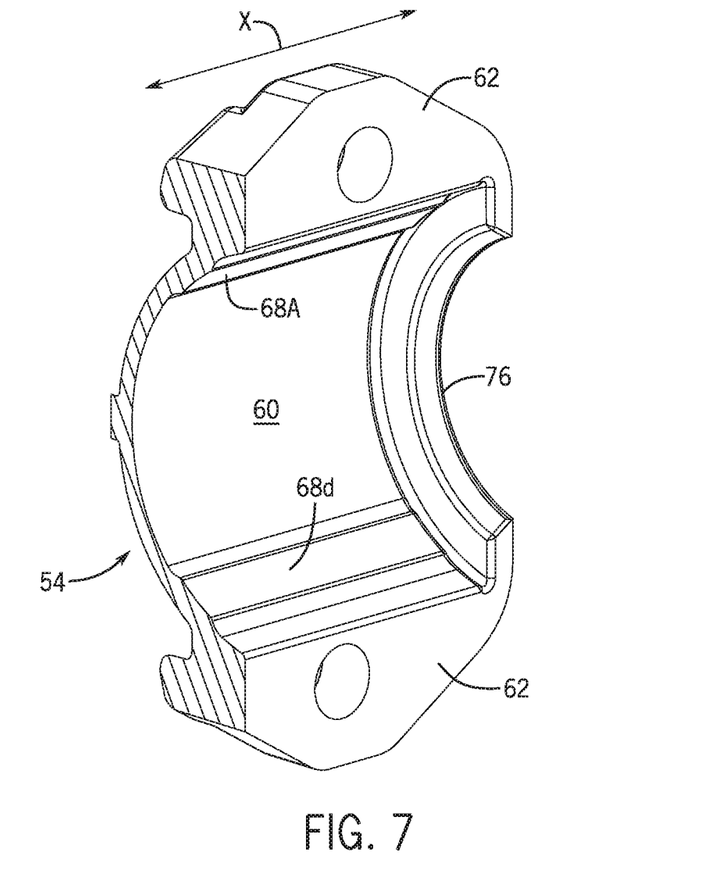
FIG. 7 is a detailed view of a cover used in the arrangements of FIGS. 1-6.

Referring to FIGS. 5-7, the localized area of contact is provided by at least one protrusion 68a extending into the cavity 64 from one of the first and second concave surfaces 58, 60. As shown herein, the protrusion 68a extends radially inwardly from the second concave surface 60 defined on the inner face 62 of the cover 54. In the example of FIG. 6, both the first concave surface 58 and the second concave surface 60 have a protrusion 68a, 68b that extends into the cavity 64. More specifically, the first concave surface 58 has first and second protrusions 68b, 68c that extend into the cavity 64 and the second concave surface 60 has third and fourth protrusions 68a, 68d that extend into the cavity 64. In the example shown, the first and third protrusions 68b, 68a are spaced generally opposite from one another across the cavity 64 and the second and fourth protrusions 68c, 68d are spaced generally opposite one another across the cavity 64. Together the protrusions crush the mount 46a within the cavity 64 on opposite sides at four different areas of relatively localized contact and relatively localized application of force, when compared to a pocket and cover that have no protrusions (i.e., have smooth inner faces).

In the example of FIG. 5, protrusions 68a, 68d are provided on the second concave surface 60, and when the cover 54 is tightened around the mount 46a, the protrusions apply relatively localized force to the mount 46a in adjacent areas. In FIG. 5, the protrusions on the first concave surface 58 of the pocket 48a are slightly modified from that shown in FIG. 6. Here, the protrusions 68b', 68c' each taper from a protruding side 71b, 71c, toward upper and lower outer edges 73a, 73b of the pocket 48a proximate an outer surface 78 of the midsection housing 40. In other words, instead of being well-defined protrusions with a discrete step on both sides as in FIG. 6, the protrusions 68b', 68c' fade away from the mount 46a and blend into the draft of the pocket 48a. This shape helps support vertical loads, while still providing the relatively localized application of force at protruding sides 71b, 71c. Additionally, because the protruding side 71c is provided radially opposite the protrusion 68d, and the protruding side 71b is provided radially opposite protrusion 68a, the above-mentioned radial crushing effect is still realized upon tightening of the cover 54.

In one example, the first and second concave surfaces 58, 60 are semi-cylindrical, and the mount 46a comprises a generally tubular structure having a tubular outer shell 70 surrounding a tubular inner shell 72 defining the bore hole 52, and an elastomeric spacer 74 held between the tubular outer and inner shells 70, 72. Other types of mounts could be provided, such as those described in the above-mentioned '701 patent.

In one example, the protrusions 68a-68d, 68b', 68c' are integral with one of the first and second concave surfaces 58, 60. For example, the protrusions may be formed during die-casting of the cover 54 and the driveshaft housing 38. Alternatively, the protrusions may be glued, welded, or otherwise coupled or connected to the first and second concave surfaces 58, 60. Further, as shown in FIGS. 3 and 7, the protrusions may extend along a majority of an axial length (the axial direction being labeled x in FIG. 7) of one of the first concave surface 58 and the second concave surface 60. In the example shown, the protrusions 68a, 68d extend the entire length of the concave surface 58 of the cover 54, except where the protrusions 68a, 68d encounter a flange 76 that projects radially inwardly at either end of the cover 54 so as to hold the axial ends of the mount 46a therein. The protrusions 68b, 68c, 68b', 68c' can also be provided along a majority of the axial length of the pocket 48a, and can end at flanges 77 provided at axial ends thereof (FIG. 3). Providing the protrusions as such ensures that the cover 54 can deform the mount 46a and hold it tightly within the pocket 48a along the entire axial length of the mount 46a.

Providing at least one protrusion allows the cover 54 and pocket 48a to be die-cast with greater tolerances due to the deformation provided by the protrusion contacting the mount 46a upon tightening of the fasteners 56. In prior art structures, where no protrusions are provided, the tolerances required to attach the cover 54 to the midsection housing 40 were very tight. Often, when the cover 54 was tightened around the mount 46a in the pocket 48a, a gap would be left between the inner face 62 of the cover 54 and the outer surface 78 of the midsection housing 40. The protrusions 68a-68d, 68b', 68c' provide point application of force at relatively localized areas such that the tubular mount 46a can be deformed upon tightening of the plurality of fasteners 56 to hold the cover 54 over the mount 46a in the pocket 48a. In other words, the mount 46a can be forced out of its normal shape and crushed to at least partly fill the radial clearance provided between the concave surfaces 58, 60 and the outer surface 66 of the mount 46a in areas where there are no protrusions. The inner face 62 of the cover 54 can therefore lay flush with the outer surface 78 of the midsection housing 40, and bending of the heads of the fasteners 56 is prevented, as the heads can now lay flat against the outer surface of the cover 54.

Deforming or crushing of the mount 46a is achievable in part because the outer shell 70 is relatively thin metal and can be pressed into the elastomeric spacer 74 held between the outer shell 70 and the inner shell 72. In one example, the protrusions 68a-68d, 68b', 68c' are sized and shaped such that they deform the mount 46a within its elastic range. This ensures that the mount is not permanently deformed, and also that a spring force of the mount is utilized to hold the mount 46a tightly between the cover 54 and the pocket 48a. In one example, the mount 46a can be crushed by between about 0.005 and 0.04 inches and still remain within its elastic range. In another example, the mount can be crushed between 0.01 and 0.03 inches and remain within its elastic range. Allowing greater tolerances, and in one example double the tolerances required for a cover and pocket provided without protrusions, makes the mounting arrangement of the present disclosure easier and less expensive to manufacture in terms of reduced cycle times and fewer quality issues. The tolerances along the axial length (in the x direction) of the mount 46a are also able to be increased: as the mount 46a is crushed and slightly deformed within the cavity 64, it is also held therein by a spring force of the elastomeric spacer 74 and is less easily displaced in the axial direction.

In the examples shown in FIGS. 5-7, the protrusions 68a-68d have somewhat trapezoidal shapes when viewed in cross section. However, the protrusions could also have a triangular shape, a convex rounded shape, or a rectangular shape when viewed in cross section. Alternatively, the protrusions 68a-68d could be provided with very slightly sloped tapers on one end of the protrusions, such as shown by protrusions 68b', 68c' in FIG. 5. Further, it should be understood that any number of protrusions could be provided, and that the protrusions need not be provided directly radially opposite one another as shown in the Figures. Additionally, protrusions could be provided on only the first concave surface 58 or only the second concave surface 60. It should also be noted that although the protrusions on the cover 54 and pocket 48 have been described with respect to the first mount 46a, the same description herein applies equally to the second mount 46b, as well as to the upper mounts 44a, 44b.

It should also be understood that the protrusions could instead be provided to extend radially outwardly from the outer shell 70 of the mount 46a, rather than radially inwardly from the concave surfaces 58, 60. However, this would require careful machining of the mount, whereas providing the protrusions on the cover 54 or in the pockets 48 requires merely making a new mold for die casting the parts.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. An arrangement for coupling a vibration isolation mount to an outboard motor, the arrangement comprising:
    a pocket formed in a midsection housing of the outboard motor, the pocket defining a first concave surface; and
    a cover configured to be mounted to the midsection housing over the pocket via a plurality of fasteners that extend through the cover and into the midsection housing, the cover defining a second, oppositely concave surface on an inner face thereof;
    wherein when the cover is mounted to the midsection housing over the pocket, the first concave surface and the second concave surface together form a cavity therebetween for holding a vibration isolation mount therein; and
    wherein one of the first concave surface and the second concave surface has a protrusion that extends into the cavity and contacts and deforms an outer radius of the mount held therein in a radial direction in response to tightening of the plurality of fasteners to hold the cover over the mount in the pocket.

2. The arrangement of claim 1, wherein both the first concave surface and the second concave surface have a protrusion that extends into the cavity.

3. The arrangement of claim 2, wherein the first concave surface has first and second protrusions that extend into the cavity and the second concave surface has third and fourth protrusions that extend into the cavity.

4. The arrangement of claim 3, wherein the first and third protrusions are spaced generally opposite from one another across the cavity and the second and fourth protrusions are spaced generally opposite one another across the cavity.

5. The arrangement of claim 1, wherein the first and second concave surfaces are semi-cylindrical.

6. The arrangement of claim 5, wherein the mount comprises a generally tubular structure having a tubular outer shell surrounding a tubular inner shell and an elastomeric spacer held between the tubular outer and inner shells.

7. The arrangement of claim 1, wherein the protrusion is shaped and sized such that the protrusion deforms the mount within an elastic range.

8. The arrangement of claim 1, wherein the protrusion extends along a majority of an axial length of the one of the first concave surface and the second concave surface.

9. The arrangement of claim 1, wherein the protrusion has a protruding side and a tapered side that blends into the one of the first concave surface and the second concave surface.

10. A mounting arrangement for supporting an outboard motor on a marine vessel transom, the mounting arrangement comprising:
   a pocket formed in a midsection housing of the outboard motor, the pocket defining a first concave surface;
   a vibration isolation mount situated in the pocket and coupled to the marine vessel via a connector extending through a borehole in the mount and coupled to a transom bracket; and
   a cover configured to be mounted to the midsection housing over the mount in the pocket via a plurality of fasteners, the cover defining a second, oppositely concave surface on an inner face thereof;
   wherein the first concave surface and the second concave surface define a cavity therebetween; and
   wherein an outer surface of the mount and an inner surface of the cavity have at least one area of localized contact between the two that extends along a majority of an axial length of the mount, such that the mount is deformed by localized application of force in a radial direction in response to the plurality of fasteners being tightened to hold the cover over the mount in the pocket; and
   wherein radial clearance is provided between the outer surface of the mount and the inner surface of the cavity in areas other than the at least one area of localized contact.

11. The mounting arrangement of claim 10, wherein the at least one area of localized contact is provided by a protrusion extending into the cavity from one of the first and second concave surfaces, and wherein the protrusion extends along the majority of the axial length of the mount.

12. The mounting arrangement of claim 11, wherein both the first concave surface and the second concave surface have a protrusion that extends into the cavity.

13. The mounting arrangement of claim 12, wherein the first concave surface has first and second protrusions that extend into the cavity and the second concave surface has third and fourth protrusions that extend into the cavity.

14. The mounting arrangement of claim 13, wherein the first and third protrusions are spaced generally opposite from one another across the cavity and the second and fourth protrusions are spaced generally opposite one another across the cavity.

15. The mounting arrangement of claim 11, wherein the protrusion is integral with the one of the first concave surface and the second concave surface.

16. The mounting arrangement of claim 10, wherein the first and second concave surfaces are semi-cylindrical.

17. The mounting arrangement of claim 16, wherein the mount comprises a generally tubular structure having a tubular outer shell surrounding a tubular inner shell defining the borehole, and an elastomeric spacer held between the tubular outer and inner shells.

18. The mounting arrangement of claim 10, wherein the localized application of force deforms the mount within an elastic range.

19. The mounting arrangement of claim 10, wherein the at least one area of localized contact extends along an entirety of the axial length of the mount.

20. The arrangement of claim 8, wherein the protrusion extends along an entirety of the axial length of the one of the first concave surface and the second concave surface.

* * * * *